(12) United States Patent
Kanezaki et al.

(10) Patent No.: US 8,671,768 B2
(45) Date of Patent: Mar. 18, 2014

(54) PRESSURE VESSEL WITH LIFETIME VALUE DIRECTOR

(75) Inventors: Toshihiko Kanezaki, Saitama (JP); Kazuo Miyagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 13/438,239

(22) Filed: Apr. 3, 2012

(65) Prior Publication Data

US 2012/0255948 A1 Oct. 11, 2012

(30) Foreign Application Priority Data

Apr. 6, 2011 (JP) ................................. 2011-084906

(51) Int. Cl.
| | |
|---|---|
| G01B 5/30 | (2006.01) |
| G01B 7/16 | (2006.01) |
| G01L 1/00 | (2006.01) |
| G01N 3/00 | (2006.01) |
| G01M 5/00 | (2006.01) |
| G01L 9/04 | (2006.01) |

(52) U.S. Cl.
USPC .................................. 73/760; 73/786; 73/720

(58) Field of Classification Search
USPC .......................................... 73/760, 786, 720
See application file for complete search history.

(56) References Cited

U.S. PATENT DOCUMENTS

| | | | |
|---|---|---|---|
| 2,372,800 A * | 4/1945 | Stearns | 220/586 |
| 3,140,006 A * | 7/1964 | Nelson | 220/587 |
| 5,522,428 A * | 6/1996 | Duvall | 137/624.11 |
| 6,432,176 B1 * | 8/2002 | Klos et al. | 96/117.5 |
| 7,868,775 B2 * | 1/2011 | Sirosh et al. | 340/612 |
| 8,408,254 B2 * | 4/2013 | Shibukawa et al. | 141/82 |
| 2011/0005329 A1 * | 1/2011 | Matsuoka et al. | 73/799 |
| 2011/0303017 A1 * | 12/2011 | Kuebel | 73/720 |
| 2013/0139897 A1 * | 6/2013 | Kim et al. | 137/2 |

FOREIGN PATENT DOCUMENTS

| | | | |
|---|---|---|---|
| JP | 05-018497 A | | 1/1993 |
| JP | 09-324900 A | | 12/1997 |
| JP | 2006275223 A | * | 10/2006 |
| JP | 2009115126 A | * | 5/2009 |

* cited by examiner

*Primary Examiner* — Lisa Caputo
*Assistant Examiner* — Jamel Williams
(74) *Attorney, Agent, or Firm* — Squire Sanders (US) LLP

(57) ABSTRACT

A remaining lifetime of a pressure vessel mounted on a fuel cell vehicle or the like and comprises a liner at its inner side and a reinforcing layer at its outer side can be predicted with high precision and in short time. An artificial imperfect structure is formed at an outer surface of the liner in a size capable of being maintained by a weakest part of a hydrogen gas tank throughout the total period of use of the hydrogen gas tank. A detector is, for example, comprised of a crack gauge intervening between the liner and the reinforcing layer, and is fixed to the outer surface of the liner close to the artificial imperfect structure. A crack length increases accompanying the increase of a pressure cycle of an internal pressure caused by usage of the hydrogen gas tank. The detector increases a resistance value accompanying a crack growth.

5 Claims, 10 Drawing Sheets

FIG.7
(a)
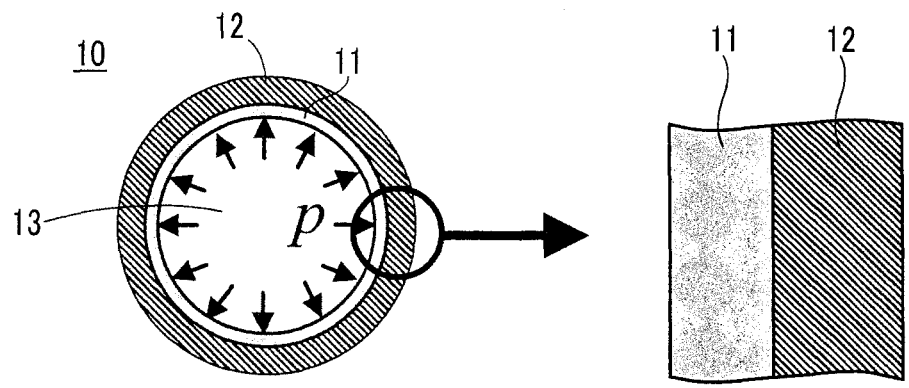
(b)
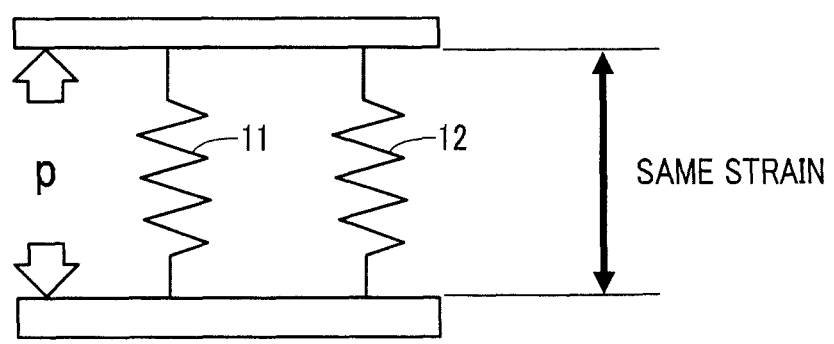

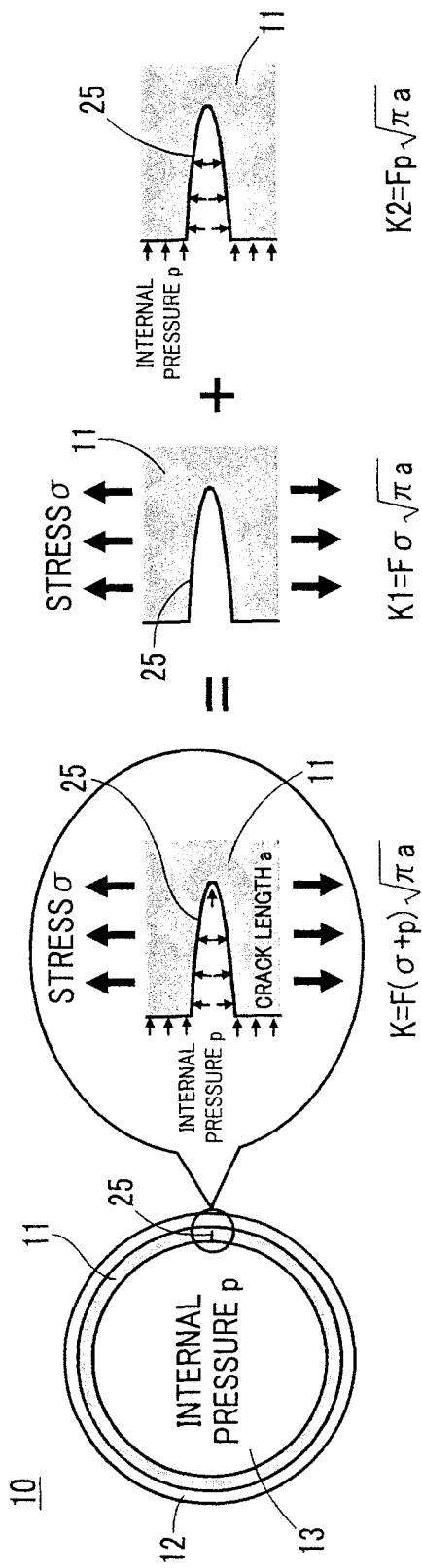

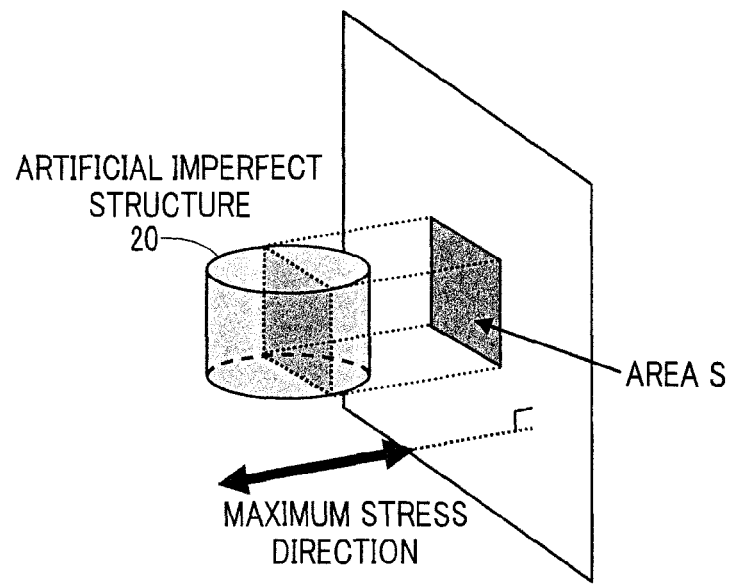
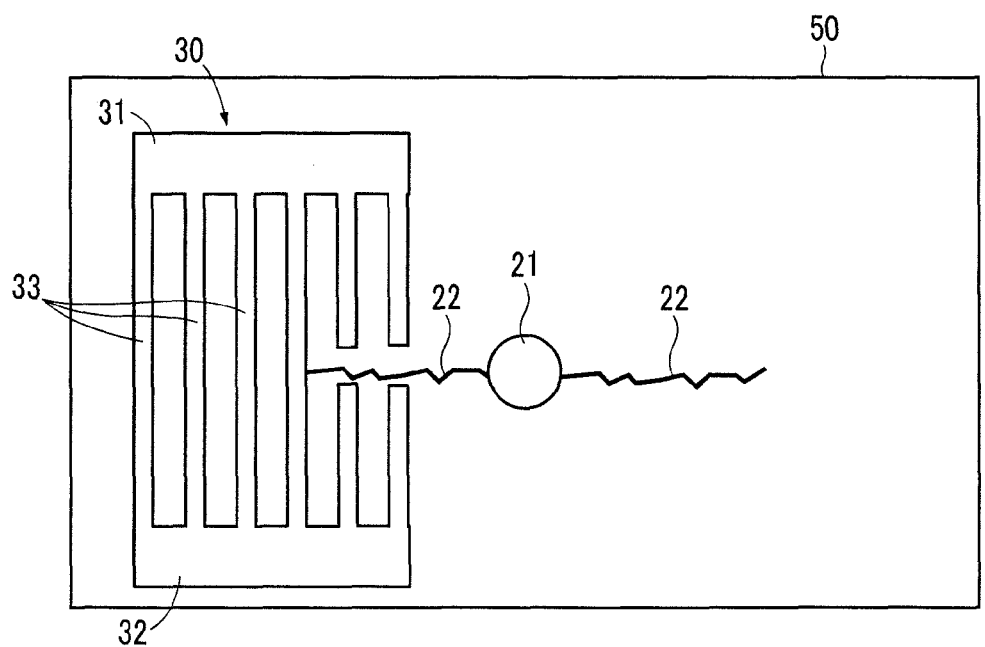
FIG.12

PRESSURE VESSEL WITH LIFETIME VALUE DIRECTOR

BACKGROUND OF THE INVENTION

Field of the Invention

The present invention relates to a pressure vessel which is mounted on a fuel cell vehicle and the like and which is equipped with a function for predicting a lifetime thereof.

SUMMARY OF THE INVENTION

Background Art

A pressure vessel for storing a high-pressure gas as a fuel is mounted on a fuel cell vehicle or a compressed natural gas vehicle. The pressure vessel is a compound vessel equipped with a liner which defines a storage space of the high-pressure gas at the inner side thereof, and a reinforcing layer which surrounds the liner. Further, as a general material, an aluminum alloy or resin is adopted for the liner, and a CFRP (carbon fiber reinforced plastics) is adopted for the reinforcing layer.

The pressure vessel repeats a pressure cycle in which the internal pressure rises by the filling of the high-pressure gas, and the internal pressure decreases accompanying the discharge to the fuel cell and the like. The repetition of such pressure cycle becomes a cause of generation of cracks and growth thereof of the pressure vessel. The growth of the crack affects a lifetime of the pressure vessel.

The conventional pressure vessels had large variation of the lifetime thereof, so that intensity more than necessary is imparted to the pressure vessels, leading to increased weight and increased price. Further, usage of the pressure vessels varies, for example, in each fuel cell vehicle. Therefore, if the lifetime of each pressure vessel can be predicted with high precision and the pressure vessel can be exchanged just before end of the lifetime, it is extremely beneficial with respect to reducing weight of the pressure vessel and the like.

Conventional lifetime predicting method of a pressure vessel includes (a) preliminarily checking the lifetime by performing a pressure cycle examination to a product of a same type, and applying the examination result to other pressure vessels of the same type, (b) cutting out a test piece from a pressure vessel of a same type as the pressure vessel in use, checking a fatigue degree of the test piece with a fatigue test, and predicting the lifetime of the pressure vessel from the examination result, and (c) performing a non-destructive test using ultrasonic device and the like to the pressure vessel in use, checking damages, and predicting the lifetime from the damages found.

Japanese Patent laid-open No. H9-324900 discloses a monitoring device for monitoring damages from heat fatigue of pipes in which fluid with temperature variation flows, in a nuclear power plant or the like. According to the monitoring device, a thin-walled portion is formed in the pipe by processing a hole at an outer peripheral portion of the pipe receiving heat fatigue, so as to make the thin-walled portion a concentrated region of the heat fatigue damages in the pipe. By doing so, the heat fatigue at this thin-walled portion is made to proceed than in other portions, and the accumulation of the heat fatigue damages is detected by measuring a strain of the thin-walled portion.

Japanese Patent laid-open No. H5-18497 discloses a lifetime predicting method of a pressure vessel used under high-temperature and high-pressure. On the basis of two findings that (a) temper embrittlement amount of a steel of the pressure vessel is proportional to intergranular segregation amount of impurities, and (b) if equilibrium segregation amount of the impurities at a temperature history and each temperature during use is known, then the intergranular segregation amount of impurities generated under complex heat cycle including repetition of heating and cooling may be predicted, the lifetime predicting method predicts the lifetime of the pressure vessel by calculating the intergranular segregation amount of the impurities, by applying, with respect specific content included in the material of the pressure vessel, an actual temperature history to a relational equation formulated on the relationship between the change of the intergranular segregation and the temperature change of the pressure vessel.

Of the conventional three lifetime predicting methods of the pressure vessel, the method (a) uniformly applies the examination result of the examination product to each pressure vessel, so that precision thereof decreases, and the methods (b) and (c) require extensive preparation for lifetime prediction and it is difficult to predict the same immediately.

The main objective of the monitoring device of Japan Patent Laid-Open No. H9-324900 is to monitor the heat fatigue damages and not the growth of a crack caused by the pressure cycle. Also, in the case where the monitoring device is applied for lifetime prediction of the pressure vessel, when the hole is processed on the outer surface of the pressure vessel, it will weaken the reinforcing layer so that the lifetime of the pressure vessel decreases at once.

The lifetime predicting method of the pressure vessel of Japan Patent Laid-Open No. H5-18497 is based on the temperature history, and is difficult to adopt it for the lifetime prediction of the pressure vessel in which the internal pressure change of the pressure vessel is the determining element of the lifetime thereof.

SUMMARY OF THE INVENTION

The present invention aims at enabling prediction of a lifetime of a pressure vessel in which an internal pressure thereof varying greatly with high precision and immediately, while suppressing influence of the usage and piece-to-piece variation.

Means for Solving the Problems

In the present invention, reference is made to an imperfect structure of a pressure vessel. The imperfect structure refers to characteristics on a structure (including composition and physical shape) that is defined by dynamics in material mechanics, structural dynamics and the like, and is completely different from "defect" in Article 2, paragraph 2 of the Product Liability Act of Japan. Structure with cracks or recesses is an example of the imperfect structure, with respect to a complete structure without cracks or recesses.

A pressure vessel of the present invention comprises: a liner which stores therein a pressurized fluid; a reinforcing layer which surrounds the liner and which reinforces the liner; and a detector which intervenes between the liner and the reinforcing layer, and which detects a lifetime related value which depends on at least either one of the liner and the reinforcing layer from a physical quantity of an intervening region.

According to the present invention, the detector intervenes not at the outer surface of the pressure vessel but between the liner and the reinforcing layer. By detecting the lifetime related value depending at least on one of the liner and the reinforcing layer from the physical quantity at the intervening region, it becomes possible to appropriately predict the lifetime of both the liner and the reinforcing layer. Further, it becomes possible to predict with high precision and immediately the lifetime of the pressure vessel that has piece-to-piece variation.

Preferably, the pressure vessel further comprises an artificial imperfect structure is formed on a metal material at an outer surface side of the liner so as not to expose to an inner surface of the liner, and the detector detects a growth of the artificial imperfect structure caused by a repetition of fluctuation of an internal pressure of the pressure vessel accompanying entering and exiting of the fluid into and from the pressure vessel, as the physical quantity of the intervening region.

According thereto, an imperfect structure of a metal gradually grows accompanying a repetition of fluctuation of the internal pressure of the pressure vessel. According to the second aspect of the invention, it becomes possible to appropriately predict the lifetime of the pressure vessel, by forming the artificial imperfect structure at the metal material at the outer surface side of the liner, and detecting the growth of the artificial imperfect structure as the lifetime related value.

Preferably, for an imperfect structure of the pressure vessel, when a projected area of an imperfect structure of the pressure vessel to a surface perpendicular to a direction of a maximum stress out of a stress generated at the imperfect structure is defined as S, the artificial imperfect structure is made in a size in which $\sqrt{S}$ thereof is larger than any $\sqrt{S}$ of natural imperfect structures and in which a length thereof in the direction of the maximum stress is equal to or smaller than a size in which a decrease in a pressure vessel fatigue lifetime caused by formation of the artificial imperfect structure becomes a permissible limit.

According thereto, the artificial imperfect structure maintains the largest imperfect structure in the pressure vessel during the period of use of the pressure vessel, while maintaining the decrease of the pressure vessel fatigue life caused by the existence thereof within the permissible value. Therefore, it becomes possible to predict the lifetime of the pressure vessel at each time point of the period of use, while concentrating the detection subject related to lifetime prediction only to the artificial imperfect structure.

Preferably, the detector is a crack gauge or a strain gauge.

The length of the crack at the artificial imperfect structure increases, or the strain of the region of the artificial imperfect structure increases, as the pressure vessel is used longer. According to the preferred configuration mentioned above, it becomes possible to predict the lifetime of the pressure vessel with high precision and promptly, from the length of the crack or the change of the strain caused by the growth of the artificial imperfect structure accompanying the use of the pressure vessel.

Preferably, the liner is made of resin, a metal film member intervenes between the liner and the reinforcing layer, and the artificial imperfect structure is formed on the metal film member.

According thereto, the imperfect structure in metal gradually grows together with the accumulation of the fatigue of the metal, whereas the imperfect structure in resin advances at once immediately before the end of the lifetime, so that the lifetime prediction from observing the imperfect structure is difficult. According to the preferred configuration mentioned above, in the pressure vessel equipped with the liner made of resin, the metal film member intervenes between the liner made of resin and the reinforcing layer. By providing the artificial imperfect structure to the metal film member, the lifetime of the pressure vessel may be smoothly predicted on the basis of the observation of the growth of the artificial imperfect structure, similar to the lifetime of the pressure vessel with the liner made of metal.

Preferably, the pressure vessel comprises: a prediction unit which predicts a remaining lifetime of the pressure vessel from output from the detector, and an input-output amount control unit which controls an input-output amount of the pressurized fluid into and from the pressure vessel, so that a fluctuation range of the internal pressure of the pressure vessel decreases in the case where the remaining lifetime predicted by the prediction unit is smaller than a predetermined value, than in the case where the remaining lifetime is equal to or more than the predetermined value.

Load on the liner and the reinforcing layer may be smaller, as the amplitude fluctuation of the internal pressure of the pressure vessel becomes smaller. According to the preferred configuration mentioned above, the input-output amount of the pressurized fluid to and from the inside of the pressure vessel is controlled so as to restrain the fluctuation of the internal pressure as the pressure vessel approaches the end of the lifetime, so that the lifetime of the pressure vessel may be prolonged.

BRIEF DESCRIPTION OF THE DRAWINGS

FIG. 7 is a view showing a resisting force of the liner and the reinforcing layer with respect to the internal pressure of the hydrogen gas tank by a parallel spring model.

FIG. 10 is a view explaining a stress intensity factor for the crack at an inner side of the hydrogen gas tank;

FIG. 11 is a view explaining a projected area of the artificial imperfect structure;

FIG. 12 is a view explaining a method of applying the crack gauge when the reinforcing layer is made of resin;

BEST MODES FOR CARRYING OUT THE INVENTION

Figure 1:
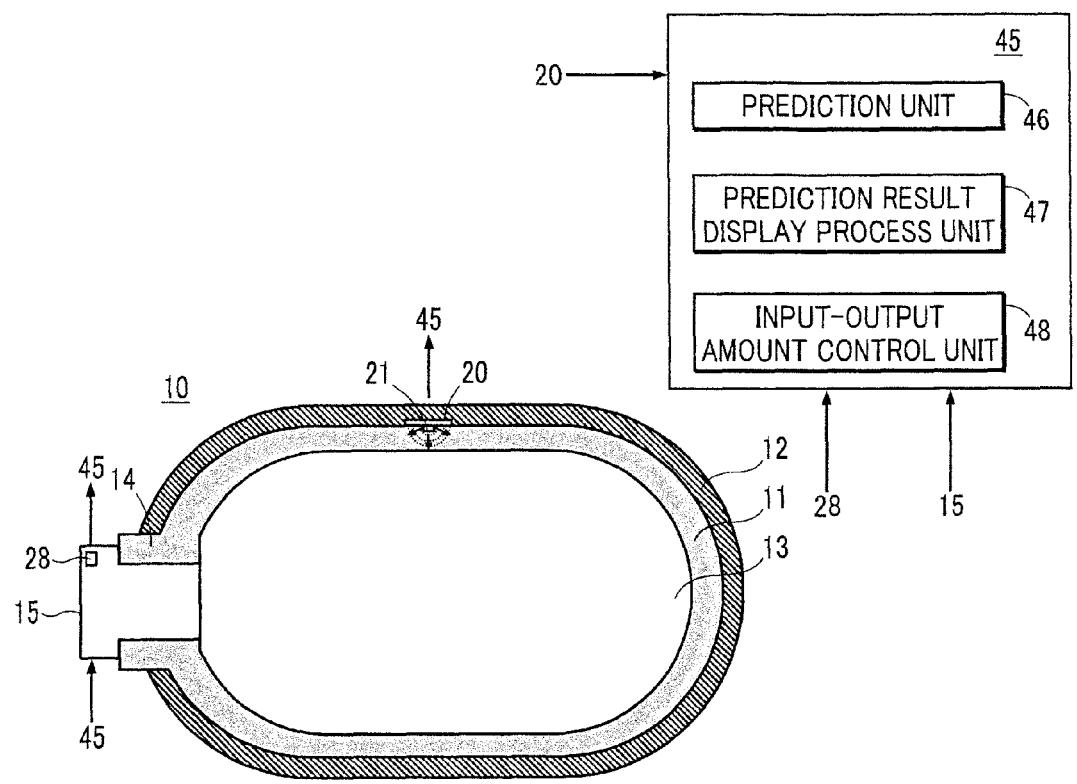
FIG. 1 is a view showing a structure of a hydrogen gas tank and a control device thereof.

In FIG. 1, a hydrogen gas tank 10 corresponds to a pressure vessel of the present invention. The hydrogen gas tank 10 is mounted on a fuel cell vehicle (not shown). The hydrogen gas tank 10 is equipped with a liner 11 which defines a storage space 13 of a predetermined volume for storing a hydrogen gas as a fuel of a fuel cell at the inner surface side thereof, and a reinforcing layer 12 which surrounds the liner 11 by covering the outer surface of the liner 11.

The liner 11 is made of an aluminum alloy, and the reinforcing layer 12 is configured in a shape in which a resin-containing reinforced fiber is wrapped around an exterior surface of the liner 11. The resin-containing reinforced fiber is, for example a CFRP, which is a carbon fiber as a material fiber soaked with an epoxy resin as a matrix resin.

The hydrogen gas tank 10 is installed transversely. The liner 11 has a gateway 14 at one end portion of an axial direction thereof, and a valve device 15 is mounted to the gateway 14. The hydrogen gas as the fuel enters and exits the storage space 13 via the valve device 15.

The hydrogen gas tank 10 has hemispheric portions at both ends in the axial line thereof, and a cylinder portion at the intermediate thereof. An artificial imperfect structure 21 is formed, for example at a joint region between the liner 11 and the reinforcing layer 12 at the intermediate cylindrical portion, for example as a columnar pore at the outer surface of the liner 11.

An imperfect structure means characteristics on a structure (including composition and physical form) that is defined by dynamics in material mechanics, structural mechanics and the like, and includes, for example, recesses formed by removing minute portion from a surface of materials, and minute cracks existing on the surface of the material. A natural imperfect structure and the artificial imperfect structure exist as the imperfect structure of the hydrogen gas tank 10. The natural imperfect structure is naturally generated during manufacturing of the hydrogen gas tank 10, and artificial imperfect structure 21 is artificially formed after manufacturing of the hydrogen gas tank 10.

The pore as the artificial imperfect structure 21 is formed at the outer surface of the liner 11, so that the pore has a depth that does not expose to the inner surface of the liner 11, and so that the region of the pore becomes the weakest portion in the liner 11 throughout a total period of use of the hydrogen gas tank 11. The conditions for securing the region of the artificial imperfect structure 21 to be the weakest region in the liner 11 will be explained later.

A detector 20 intervenes between the outer surface of the liner 11 and the inner surface of the reinforcing layer 12, so that the detector 20 covers the artificial imperfect structure 21 from the reinforcing layer 12 side, or so that the detector 20 is positioned in the vicinity of the artificial imperfect structure 21.

When the hydrogen gas tank 10 is filled up with the hydrogen gas of high pressure, an internal pressure of the hydrogen gas tank 10 increases. Thereafter, the hydrogen gas inside the hydrogen gas tank 10 is consumed accompanying the traveling of the fuel cell vehicle, and the internal pressure of the hydrogen gas tank 10 decreases. As such, a pressure cycle in which the internal pressure of the hydrogen gas tank 10 varies by filling and consumption of the hydrogen gas is repeated during the period of use.

A pressure sensor 28 is arranged inside the valve device 15, and detects the internal pressure p of the storage space 13. A control device 45 is equipped with a prediction unit 46, a prediction result display process unit 47, and an input-output amount control unit 48. The control device 45 receives detection signals related to a fatigue level or a rigidity degradation level of the hydrogen gas tank 10 from the detector 20, as lifetime-related values of the hydrogen gas tank 10. The control device 45 controls opening and closing of a valve of the valve device 15, on the basis of the detection signals from the detector 20 and the pressure sensor 28. The operation of the prediction unit 46, the prediction result display process unit 47, and the input-output amount control unit 48 will be explained later with the explanation of FIG. 13 through FIG. 15.

Figure 2:
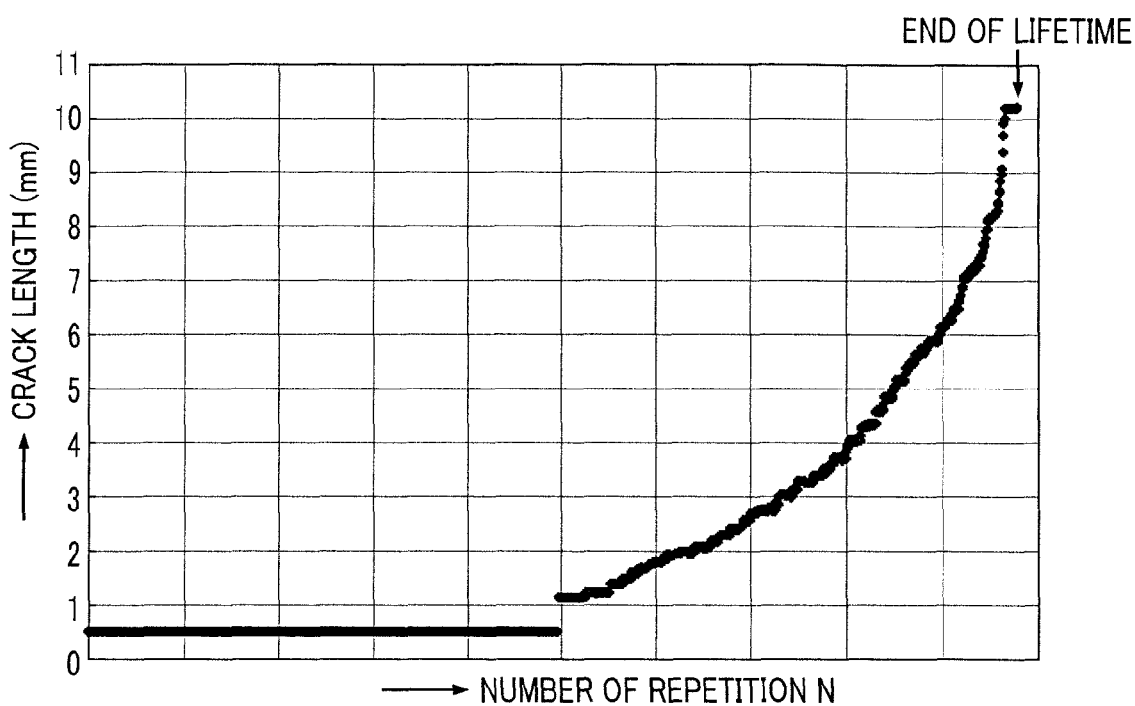
FIG. 2 is an experimental view showing a relationship between a number of repetition of a pressure cycle in the hydrogen gas tank and a growth of a crack at an artificial imperfect structure formed on the hydrogen gas tank.

Next, with reference to FIG. 2, explanation will be given on an experimental result which examined the relationship between a number of repetition of the pressure cycle in the hydrogen gas tank 10 and a growth of a crack in the artificial imperfect structure 21 formed on the hydrogen gas tank 10. In the graph of FIG. 2, the axis of abscissa shows the number of repetition of the pressure cycle in the hydrogen gas tank 10, and the axis of ordinate shows the length of the largest crack generated at the hydrogen gas tank 10. The result of experiment on the hydrogen gas tank 10 using a crack gauge 30 (FIG. 3) as the detector 20 is the characteristics of FIG. 2. A crack with initial length of 0.5 mm is formed as the artificial imperfect structure 21, and how the crack is changed accompanying the repetition of the pressure cycle is experimented. The artificial crack of 0.5 mm is the only artificial imperfect structure at the beginning of use of the hydrogen gas tank 10, and is the longest among the length of any cracks as the natural imperfect structure existing at the beginning of use of the hydrogen gas tank 10.

The length of the crack does not increase until the number of repetition of the pressure cycle reaches a predetermined value, and gradually increases when the number of repetition of the pressure cycle exceeds the predetermined value. The length of the crack increases the climb rate thereof accompanying the further increase in the number of repetition of the pressure cycle. When the length of the crack slightly exceeds 10 mm, the increase of the length of the crack stops regardless of the increase in the number of repetition, and this is the point where a hydrogen gas leakage (leak) from the hydrogen gas tank 10 occurs.

Next, with reference to FIG. 3, the configuration of the crack gauge 30 as an example of the detector 20 of FIG. 1 will be explained. The crack gauge 30 is adhered to the outer surface of the liner 11 to be sufficiently close to the artificial imperfect structure 21. The crack gauge 30 includes terminals 31, 32 at both ends thereof, and a plurality of resistances 33 that exist along in parallel to each other and at equal intervals in the arranged direction between the terminal 31-terminal 32.

Accompanying the growth of the artificial imperfect structure 21, the crack 22 extends towards the crack gauge 30, and disconnects the resistance 33 in order from the side closer to the artificial imperfect structure 21. A plurality of the resistances 33 are provided in parallel at equal intervals, and are connected to the terminals 31, 32 at both ends thereof. Therefore, the resistances 33 are in a relationship of being connected in parallel to each other. The number of disconnection of the resistance 33 increases accompanying the growth of the crack 22, and a resistance value of the crack gauge 30 also increases.

The crack 22 extends from the artificial imperfect structure 21 in the direction of a maximum stress at the position of the artificial imperfect structure 21 of the liner 11. The direction of the maximum stress is, in the hydrogen gas tank 10 of a cylinder type as is shown in FIG. 7(a) and FIG. 10 to be explained later, a circumferential direction.

Next, with reference to FIG. 4, the relationship between the length of the crack 22 and the resistance value of the crack gauge 30 in FIG. 3 will be explained. As is explained in FIG. 2, there is a relationship between the length of the crack and the remaining lifetime of the hydrogen gas tank 10, so that it is possible to predict the remaining lifetime of the hydrogen gas tank 10 from the resistance value of the crack gauge 30. The lifetime at the beginning of the use of the hydrogen gas tank 10 and the remaining lifetime at each point may be expressed not by the remaining time until end of lifetime but may be expressed by a number of cycle of the internal pressure that may be repeated from the current time point until the end of lifetime of the hydrogen gas tank 10. Further, a predicted lifetime of the hydrogen gas tank 10 predicted at current time point means the remaining lifetime.

Figure 3:
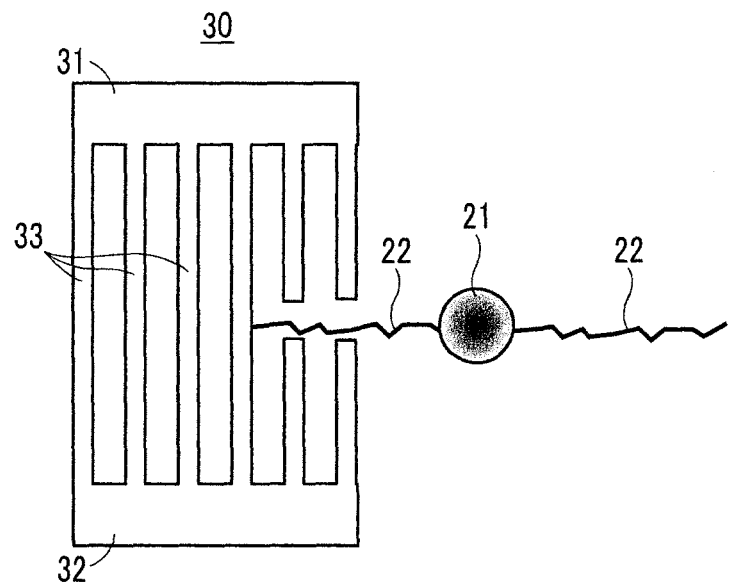
FIG. 3 is a view explaining a crack gauge which detects a length of the crack at a region formed with the artificial imperfect structure.
Figure 4:
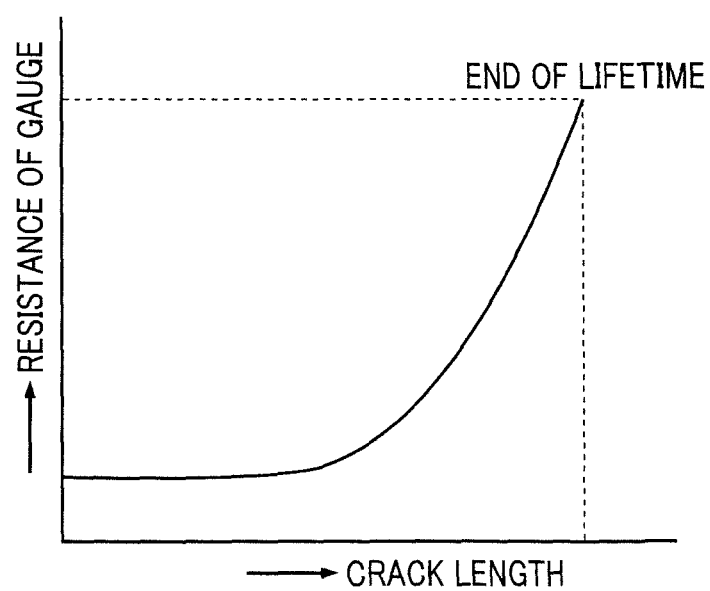
FIG. 4 is a graph showing a relationship between the length of the crack at the region formed with the artificial imperfect structure and a resistance value of the crack gauge.

The length of the crack in FIG. 4 is a sum of the length of the artificial imperfect structure 21 in FIG. 3 and the length of the two cracks 22 extending from the artificial imperfect structure 21 towards the crack gauge 30 side and the opposite side thereof.

Next, explanation will be given on a strain gauge 40 which is another example of the detector 20 in FIG. 1, with reference to the cross-sectional view of FIG. 5. The strain gauge 40 is adhered to the outer surface of the liner 11 so as to cover the artificial imperfect structure 21. A lead wire 41 which is drawn out from the strain gauge 40 inputs the detected signal of the strain gauge 40 to the control device 45.

Figure 5:
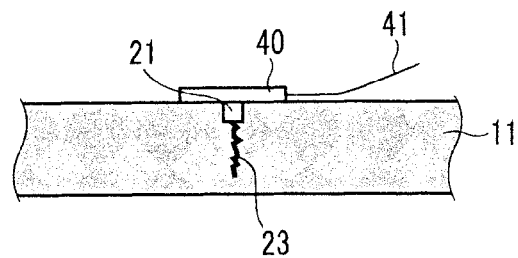
FIG. 5 is a view explaining a strain gauge which detects a strain at the region formed with the artificial imperfect structure.

A crack 23 of FIG. 5 is, compared to the crack 22 in FIG. 3 which is a view showing the growth in the maximum stress direction of the liner 11 at the artificial imperfect structure 21 observed from above, observed from the cross-section of the liner 11. Therefore, the crack 23 grows in a depth direction from the artificial imperfect structure 21 accompanying the increase in the number of repetition of the pressure cycle of the hydrogen gas tank 10. The strain gauge 40 detects the strain at the surrounding portion of the artificial imperfect structure 21 at the outer surface of the liner 11. The strain is related to the growth (increase in length) of the cracks 22, 23.

Next, with reference to FIG. 6, the relationship between the internal pressure of the hydrogen gas tank 10 and the strain detected by the strain gauge 40 taking the length of the crack 23 as a parameter will be explained. With respect to the identical internal pressure, the strain increases accompanying the increase in the length of the crack 23. As is explained in FIG. 2, there is a relationship between the length of the crack and the remaining lifetime of the hydrogen gas tank 10, so that it becomes possible to predict a current time point position in the lifetime of the hydrogen gas tank 10 (or the remaining lifetime thereof) from the strain detected by the strain gauge 40.

Next, with reference to FIG. 7, explanation will be given on a parallel spring model comprising the liner 11 and the reinforcing layer 12. FIG. 7(a) shows a cross-section of the hydrogen gas tank 10, and the hydrogen gas tank 10 has a circular cross-section. When the internal pressure p to the inner side of the liner 11 by the hydrogen gas inside the hydrogen gas tank 10 acts on the inner surface of the liner 11, the liner 11 and the reinforcing layer 12 receives a tension stress $\sigma$ in the circumferential direction of the hydrogen gas tank 10.

FIG. 7(b) shows the parallel spring model of the liner 11 and the reinforcing layer 12. In the structure of the hydrogen gas tank 10, the liner 11 and the reinforcing layer 12 receive tensile force from the identical internal pressure p, as is in the parallel spring model of FIG. 7(b), and identical strain is generated in the tensile direction.

As deterioration of the reinforcing layer 12, (a) exfoliation of the liner 11 and the reinforcing layer 12, (b) local braking of the carbon fibers inside the reinforcing layer 12, and (c) exfoliation of the carbon fiber and epoxy resin inside the reinforcing layer 12, may be presumable. The deterioration of (a) through (c) leads to decrease in the rigidity of the reinforcing layer 12 in the parallel spring model of FIG. 7(b). As can be understood from the parallel spring model, identical strain acts on the liner 11 and the reinforcing layer 12, so that the decrease in the rigidity of the reinforcing layer 12 may be detected from the strain of the liner 11.

Figure 8:
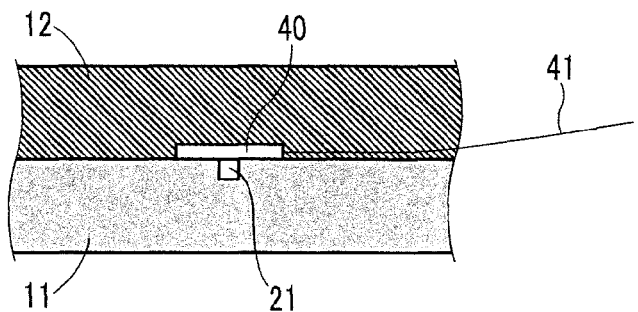
FIG. 8 is a view explaining the strain gauge which detects both life related value of the liner and the reinforcing layer.

Next, with reference to FIG. 8, explanation will be given on how the strain gauge 40 detects the lifetime of both the liner 11 and the reinforcing layer 12. The strain gauge 40 in FIG. 8 intervenes between the outer surface of the liner 11 and the inner surface of the reinforcing layer 12, and detects the strain of the liner 11 at the artificial imperfect structure 21. The decrease in the rigidity of the reinforcing layer 12 leads to the strain of the liner 11, so that the strain detected by the strain gauge 40 includes a value including the decrease in the rigidity of the reinforcing layer 12.

Figure 9:
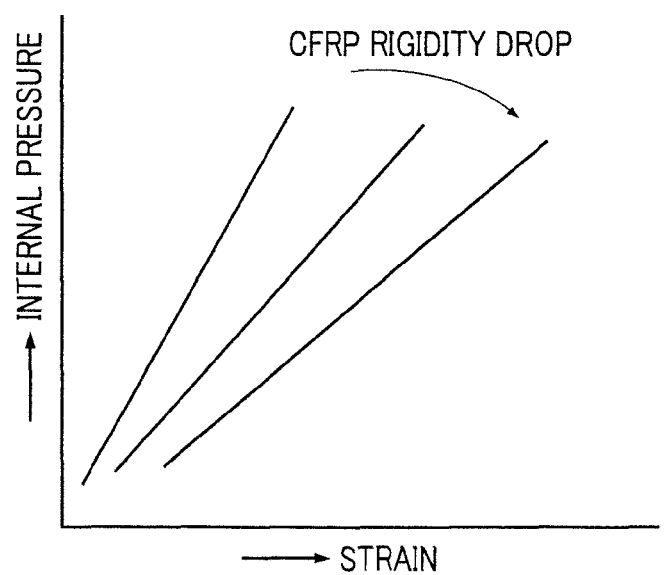
FIG. 9 is a graph showing the relationship between the internal pressure of the hydrogen gas tank and the strain at the region formed with the artificial imperfect structure taking a rigidity decrease of the reinforcing layer as a parameter.

Next, with reference to FIG. 9, explanation will be given on the relationship between the internal pressure of the hydrogen gas tank 10 and the strain detected by the strain gauge 40 taking the rigidity of the reinforcing layer 12 as the parameter. With respect to the identical internal pressure, the strain increases accompanying the decrease in the rigidity of the reinforcing layer 12. That is, it becomes possible to predict the remaining lifetime of the hydrogen gas tank 10 owing to the decrease in the rigidity of the reinforcing layer 12, from the strain detected by the strain gauge 40 in FIG. 8.

Next, with reference to FIG. 10, explanation will be given on a stress intensity factor of a crack 25 generated at the inner surface of the liner 11. The liner 11 intrinsically receives stress $\sigma$ in the tensile direction in the circumferential direction of the hydrogen gas tank 10, from the internal pressure p at the inner surface side of the liner 11. On the other hand, generally in the hydrogen gas tank 10, the crack 25 generates not at the outer surface of the liner 11 but at the inner surface thereof. When the crack 25 is generated at the inner side of the liner 11, the high-pressure hydrogen gas enters the crack 25. The internal pressure p of the entered high-pressure hydrogen gas acts in the direction of expanding the crack, and is superposed with the intrinsic stress $\sigma$.

Therefore, the stress intensity factor K at the crack of the hydrogen gas tank 10 becomes a sum of K1+K2 of the stress intensity factor K1 related to the original stress $\sigma$ and the stress intensity factor K2 related to the high-pressure hydrogen gas entered inside the crack 25. Therefore, the following equation stands. In the equation, ($\sqrt{X}$) means square root of X. The following equation is a well-known equation with respect to the stress intensity factor.

$$K1 = F\sigma(\sqrt{\pi a}) \quad (1)$$

$$K2 = Fp(\sqrt{\pi a}) \quad (2)$$

$$K = K1 + K2 = F(\sigma + p)(\sqrt{\pi a}) \quad (3)$$

where each reference means the following:

σ: nominal stress at crack region a: half-length of crack

F: constant on shape of the crack and construction, and on weight

In an ordinary lifetime evaluation test, the lifetime of the material corresponding to K1 is tested. However, it is necessary to take into consideration K2 for the lifetime of the actual hydrogen gas tank 10, so that the lifetime thereof decreases than the lifetime at the ordinary lifetime evaluation test, as much as K2 corresponding to the pressure effect of the internal pressure p.

Next, the size of the artificial imperfect structure 21 (FIG. 1) will be explained. When an area of the artificial imperfect structure 21 when projected onto a surface perpendicular to the direction in which the maximum stress works is defined as S (unit: square millimeters), as is shown in FIG. 11, the size of the artificial imperfect structure 21 is set to become $(\sqrt{S})=0.10$ to $1.0\ \text{mm}^2$. However, in the case where the ratio of the depth and the length of the artificial imperfect structure 21 is five times or more, a value obtained by multiplying $(\sqrt{10})$ by the smaller length among the depth of the imperfect structure and the length of the imperfect structure becomes the size of the artificial imperfect structure 21. In FIG. 11, the projected area S of the artificial imperfect structure 21 is defined, however, a projected area S for the natural imperfect structure will be defined similarly.

In the manufacturing process of the hydrogen gas tank 10, generally, imperfect structures (natural imperfect structures) with the length of approximately 0.1 mm are generated. Therefore, in order to surely start fatigue failure from the artificial imperfect structure 21, and to maintain the artificial imperfect structure 21 as the maximum imperfect structure of the hydrogen gas tank 10 throughout the total period of use of the hydrogen gas tank 10, that is, in order to maintain the artificial imperfect structure 21 as the weakest portion of the hydrogen gas tank 10 throughout the total period of use of the hydrogen gas tank 10, the size of the artificial imperfect structure 21 must be 0.1 mm or more.

The artificial imperfect structure 21 is formed on the outer surface side of the liner 11, so that the pressure effect of the internal pressure p corresponding to K2 of the above equation (2) does not affect the same. In order to ensure that the artificial imperfect structure 21 becomes the weakest portion of the hydrogen gas tank 10 throughout the total period of use of the hydrogen gas tank 10, the size of the artificial imperfect structure 21 must be set appropriately larger than the size of the natural imperfect structure.

The reason for maintaining the artificial imperfect structure 21 to be the weakest portion of the hydrogen gas tank 10 throughout the total period of use of the hydrogen gas tank 10 is because the remaining lifetime at each time point of the period of use of the hydrogen gas tank 10 is determined by the largest imperfect structure among all imperfect structures in the hydrogen gas tank 10. Therefore, in predicting the remaining lifetime of the hydrogen gas tank 10, it becomes possible to omit observation of all other imperfect structures, by observing only the size of the largest imperfect structure.

When the size of the artificial imperfect structure 21 is made to be, for example, approximately twice the size of the natural imperfect structure (for example, 0.2 mm) or larger, fatigue acting on the natural imperfect structure of 0.1 mm at the inner surface side of the liner 11 is reduced to approximately half that of the case where the size of the artificial imperfect structure 21 is 0.1 mm. Therefore, by setting the size of the artificial imperfect structure 21 to a guideline of twice or more of the size of the natural imperfect structure, it becomes possible to ensure that the artificial imperfect structure 21 becomes the weakest portion of the hydrogen gas tank 10 throughout the total period of use of the hydrogen gas tank 10.

On the other hand, in the imperfect structure of 1 mm or more, the decrease amount of the fatigue life becomes remarkable. Therefore, in the case where the artificial imperfect structure 21 is made to be 1 mm or more, it becomes necessary to make measures such as decrease the allowable stress design and the like, which leads to increase in the weight of the hydrogen gas tank 10. Therefore, as is explained before, it is appropriate to make the maximum of $(\sqrt{S})$ of the artificial imperfect structure 21 to be 1 mm.

Next, with reference to FIG. 12, explanation will be given on a lifetime detector which is applied to the hydrogen gas tank 10 where the liner 11 is not made of metal but is made of resin. In the case where the liner 11 is made of metal, it is easier to emit the heat of the storage space 13 to outside, whereas in the case where the liner 11 is made of resin, it is easier to fabricate the liner 11.

Not like the metal fatigue in the metal liner, the liner 11 made of resin reaches end of lifetime from various reasons such as fatigue degradation of the reinforcing layer. Therefore, it is difficult to detect the current time point position in the lifetime (or the remaining lifetime) of the hydrogen gas tank 10 from the growth of the artificial imperfect structure 21 by fabricating the artificial imperfect structure 21 to the liner 11 made of resin. A detecting device of FIG. 12 aims at handling this problem. That is, in FIG. 12, a thin-film metal plate 50 is provided apart from the liner 11 and the reinforcing layer 12. In the detecting device of FIG. 12, the structure of FIG. 3 explained earlier is applied not on the outer surface of the line 11 but on the thin-film metal plate 50.

The thickness of the thin-film metal plate 50 may be set arbitrarily. The artificial imperfect structure 21 is fabricated on the thin-film metal plate 50 so as to penetrate the thin-film metal plate 50 or to have a bottom. The crack gauge 30 is fixed to the thin-film metal plate 50 with respect to the artificial imperfect structure 21 of FIG. 12, at the same relative position as in the case of the crack gauge 30 with respect to the artificial imperfect structure 21 in FIG. 3. The fixed surface of the crack gauge 30 may be on the side of the reinforcing layer 12 or the side of the liner 11 of the thin-film metal plate 50. This is because the crack gauge 30 will be intervening between the liner 11 and the reinforcing layer 12 regardless of which surface of the thin-film metal plate 50 the crack gauge 30 is fixed to.

The thin-film metal plate 50 fabricated with the artificial imperfect structure 21 and to which the crack gauge 30 is fixed intervenes between the outer surface of the liner 11 and the inner surface of the reinforcing layer 12. The length of the crack 22 increases accompanying the use of the hydrogen gas tank 10, and the resistance value of the crack gauge 30 changes as is shown in FIG. 4. As such, it becomes possible to predict the remaining lifetime at each point in use of the hydrogen gas tank 10, even with respect to the hydrogen gas tank 10 in which the liner 11 is made of resin.

In FIG. 12, the crack gauge 30 is mounted on the thin-film metal plate 50. However, the strain gauge 40 of FIG. 5 may be mounted on the thin-film metal plate 50.

Figure 13:
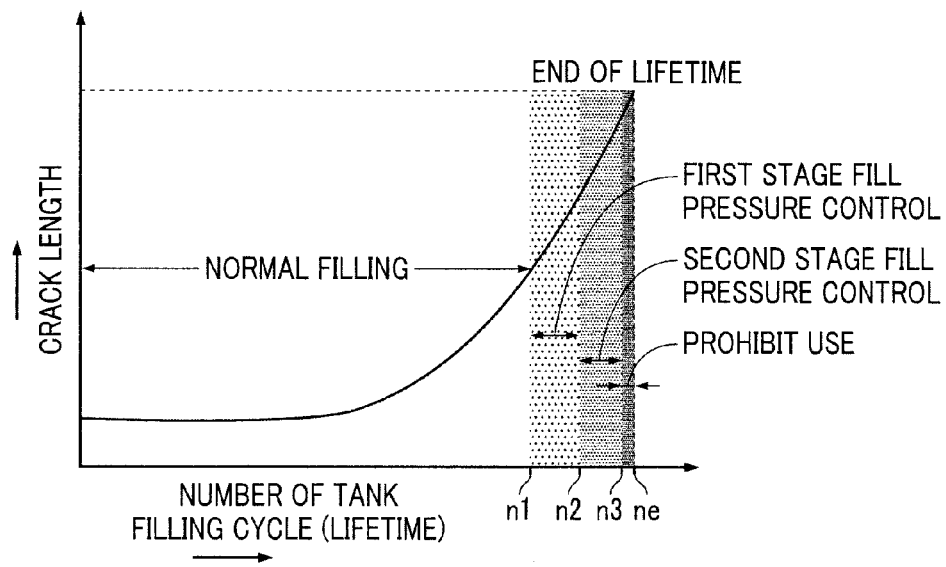
FIG. 13 is a view explaining the relationship between a remaining lifetime of the hydrogen gas tank and a fill pressure control performed in correspondence thereto.

Next, with reference to FIG. 13, explanation will be given on a fill pressure control of the hydrogen gas tank 10 executed by the control device 45 of FIG. 1. FIG. 13 shows the fill pressure control executed by the control device 45 at each lifetime period of the hydrogen gas tank 10. As is explained with reference to FIG. 2, the current time point position in the lifetime (or the remaining lifetime) of the hydrogen gas tank 10 may be predicted from the length of the crack. On the other hand, the load of the hydrogen gas tank 10 decreases as an internal pressure amplitude which is a difference between a maximum pressure and a minimum pressure in the pressure cycle of the internal pressure becomes smaller. Therefore, the lifetime of the hydrogen gas tank 10 may be prolonged by making the internal pressure amplitude in the pressure cycle of the internal pressure smaller.

Figure 6:
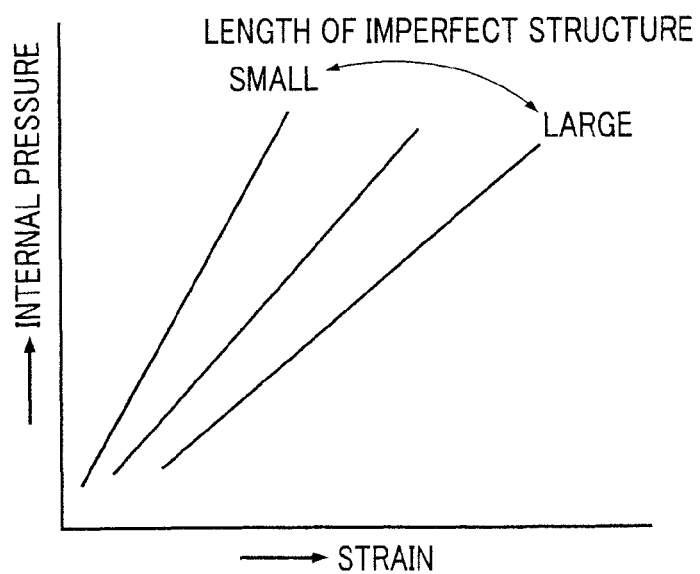
FIG. 6 is a graph showing a relationship between an internal pressure of the hydrogen gas tank, and the strain and the length of the crack at the region formed with the artificial imperfect structure.

The prediction unit 46 receives the detection signal from the detector 20, derives the length of the artificial imperfect structure 21 on the basis of the characteristics in FIG. 4 or FIG. 6, and calculates the number of repetition of the pressure cycle n from the derived length of the artificial imperfect structure 21 on the basis of the characteristics in FIG. 2. The number of repetition n calculated by the prediction unit 46 corresponds to the current time point position in the lifetime of the hydrogen gas tank 10.

The prediction result display process unit 47 informs to the user and the like of the hydrogen gas tank 10 by showing on a display (not shown) the number of repetition n calculated by the prediction unit 46 directly, or so that the current time point position in the lifetime of the hydrogen gas tank 10 is apparent, for example n/ne (where ne is the number of pressure cycles at the end of lifetime of the hydrogen gas tank 10).

The input-output amount control unit 48 determines which period in the lifetime of the hydrogen gas tank 10 the number of repetition n corresponds to, on the basis of the number of repetition n calculated by the prediction unit 46. In FIG. 13, the period in which n belongs is divided into four periods, namely, $0 \leq n < n1$, $n1 \leq n < n2$, $n2 \leq n < n3$, and $n3 \leq n \leq ne$.

In the period of $0 \leq n < n1$, the input-output amount control unit 48 does not send control signal to the valve device 15, and a fill pressure control of the hydrogen gas tank 10 is not carried out. That is, the filling and consumption of the hydrogen gas to and from the hydrogen gas tank 10 is placed at the user's disposal within the range of equal to or less than the maximum fill pressure of the hydrogen gas tank 10.

In the case where the n is $n1 \leq n < n2$ and $n2 \leq n < n3$, the input-output amount control unit 48 executes a first and a second stage fill pressure control, respectively, to the valve device 15. When n is $n3 \leq n$, the input-output amount control unit 48 determines that the end of lifetime of the hydrogen gas tank 10 is close at hand, closes the valve device 15, discontinues the filling of hydrogen gas into the hydrogen gas tank 10, and prohibits the use of the hydrogen gas tank 10.

During the first stage fill pressure control period by the input-output amount control unit 48, the valve device 15 controls the internal pressure of the hydrogen gas tank 10 so that the internal pressure amplitude inside the hydrogen gas tank 10 falls within a first predetermined value a1. The change in the internal pressure of the hydrogen gas tank 10 in the first stage fill pressure control and the subsequent second stage fill pressure control will be explained in FIG. 14 and FIG. 15.

During the second stage fill pressure control period by the input-output amount control unit 48, the valve device 15 controls the internal pressure of the hydrogen gas tank 10 so that the internal pressure amplitude inside the hydrogen gas tank 10 falls within a second predetermined value a2 (where a2<a1).

Figure 14:
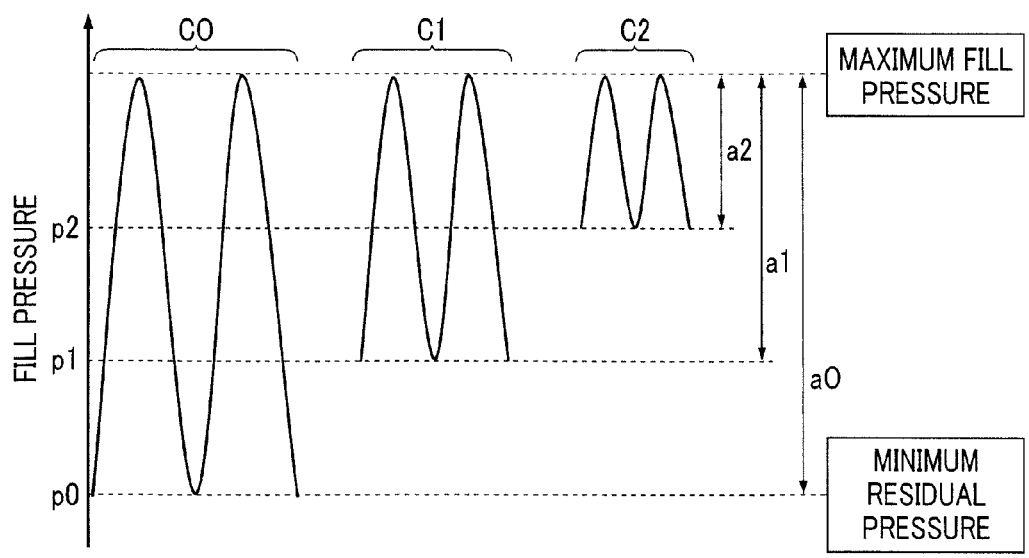
FIG. 14 is a view showing a first example of a pressure fluctuation in the fill pressure control performed in correspondence to the remaining lifetime of the hydrogen gas tank.

FIG. 14 shows a first example of the amplitude of the fill pressure (the internal pressure p) of the pressure cycle in the hydrogen gas tank 10 generated from the result of control of the valve device 15 by the input-output amount control unit 48 of the control device 45. The fill pressure rises accompanying the filling of hydrogen gas into the liner 11 from the valve device 15, and decreases accompanying the supply of the hydrogen gas from the hydrogen gas tank 10 to the fuel cell.

The pressure cycles C0, C1, and C2 shows the pressure cycle in each period of a normal filling, a first stage fill pressure control, and a second stage fill pressure control in FIG. 14. The amplitude of the fill pressure in the pressure cycles C0, C1, and C2 are respectively set to a0, a1, and a2 (a0>a1>a2).

The pressure cycle C0 indicates non-execution of the fill pressure control, and the hydrogen gas is filled into the hydrogen gas tank 10 to a maximum fill pressure and is consumed until the pressure inside the hydrogen gas tank 10 becomes a minimum residual pressure p0 which shows that the hydrogen gas is almost empty. As a result, the amplitude of the fill pressure in the pressure cycle becomes a0 (=maximum fill pressure−p0).

In the pressure cycle C1, the first stage fill pressure control is performed. The upper limit of the fill pressure is set to the maximum fill pressure, but the lower limit is set to a p1 which is appropriately higher than the minimum residual pressure p0, so that the amplitude of the fill pressure becomes a1 (=the maximum fill pressure−p1).

In the pressure cycle C2, the second state fill pressure control is performed. The upper limit of the fill pressure is set to the maximum fill pressure, but the lower limit is set to p2 which is appropriately higher than p1, so that the amplitude of the fill pressure becomes a2 (=the maximum fill pressure−p2).

Figure 15:
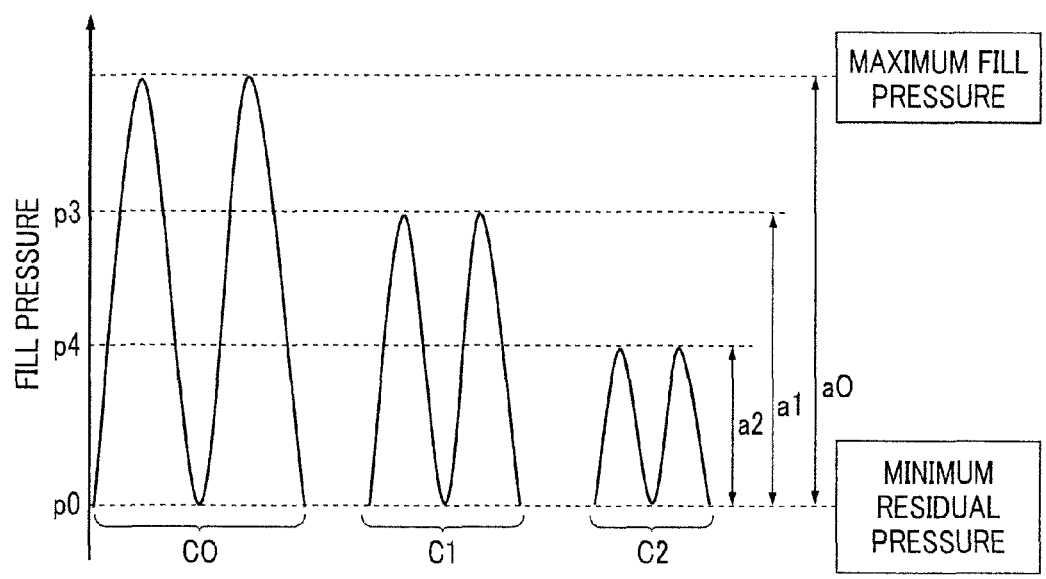
FIG. 15 is a second example of the pressure fluctuation in the fill pressure control performed in correspondence to the remaining lifetime of the hydrogen gas tank.

FIG. 15 shows a second example of the amplitude of the fill pressure (the internal pressure p) of the pressure cycle of the hydrogen gas tank 10 generated as a result of the control of the valve device 15 by the input-output amount control unit 48 of the control device 45.

The difference between the pressure cycles C0, C1, and C2 in FIG. 14 and the pressure cycles C0, C1, and C2 in FIG. 15 is as follows. In the pressure cycles C0, C1, and C2, the amplitude of the fill pressure is set to be a0, a1, and a2, respectively. The lower limit fill pressure is changed in the pressure cycles C0, C1, and C2 in FIG. 14, whereas the lower limit is fixed to the minimum residual pressure p0 but the upper limit fill pressure is changed to p3, p4 (p3>p4), respectively, in the pressure cycles C0, C1, and C2 in FIG. 15. By doing so, a1 becomes p3−p0, and a2 becomes p4−p0.

In order to make the amplitude of the fill pressure in the pressure cycles C0, C1, and C2 to be a0, a1, and a2, the upper limit fill pressure in the pressure cycles is changed in FIG. 14, and the lower limit fill pressure in the pressure cycles is changed in FIG. 15. However, it is also possible to change both of the upper limit and the lower limit thereof.

In the best modes for carrying out the invention, explanation is given on the present invention with respect to the pressure vessel mounted on the fuel cell vehicle. However, the present invention may be applied to other pressure vessels.

In the best modes for carrying out the invention, explanation is given on the present invention with respect to the hydrogen gas tank 10 mounted on the fuel cell vehicle. However, the present invention may be applied to pressure vessels storing high-pressure gases other than hydrogen gas, or pressure vessels storing high-pressure gases other than those used as the fuel of the automobile.

In the best modes for carrying out the invention, the lifetime of the hydrogen gas tank 10 is expressed using the number of repetition of the pressure cycle as the unit. However, the length of the crack or the strain itself may be used as the predicted value of the lifetime (remaining lifetime at each point of use).

What is claimed is:

1. A pressure vessel comprising:
a liner which stores therein a pressurized fluid;

a reinforcing layer which surrounds the liner and which reinforces the liner; and a detector which intervenes between the liner and the reinforcing layer, and which detects a lifetime related value which depends on at least either one of the liner and the reinforcing layer from a physical quantity of an intervening region, wherein an artificial imperfect structure is formed on a metal material at an outer surface side of the liner so as not to expose to an inner surface of the liner, and the detector detects a growth of the artificial imperfect structure caused by a repetition of fluctuation of an internal pressure of the pressure vessel accompanying entering and exiting of the fluid into and from the pressure vessel, as the physical quantity of the intervening region.

2. The pressure vessel according to claim 1, wherein when a projected area of an imperfect structure of the pressure vessel to a surface perpendicular to a direction of a maximum stress out of a stress generated at the imperfect structure is defined as S, the artificial imperfect structure is made in a size in which $\sqrt{S}$ thereof is larger than any $\sqrt{S}$ of natural imperfect structures and in which a length thereof in the direction of the maximum stress is equal to or smaller than a size in which a decrease in a pressure vessel fatigue lifetime caused by formation of the artificial imperfect structure becomes a permissible limit.

3. The pressure vessel according to claim 1, wherein the detector is a crack gauge or a strain gauge.

4. The pressure vessel according to claim 1, wherein the liner is made of resin, a metal film member intervenes between the liner and the reinforcing layer, and he artificial imperfect structure is formed on the metal film member.

5. The pressure vessel according to claim 1, wherein the pressure vessel comprises:

a prediction unit which predicts a remaining lifetime of the pressure vessel from output from the detector, and an input-output amount control unit which controls an input-output amount of the pressurized fluid into and from the pressure vessel, so that a fluctuation range of the internal pressure of the pressure vessel decreases in the case where the remaining lifetime predicted by the prediction unit is smaller than a predetermined value, than in the case where the remaining lifetime is equal to or more than the predetermined value.

* * * * *